(12) United States Patent
Yoshida

(10) Patent No.: US 7,619,871 B2
(45) Date of Patent: Nov. 17, 2009

(54) FEEDTHROUGH MULTILAYER CAPACITOR ARRAY

(75) Inventor: Takeru Yoshida, Tokyo (JP)

(73) Assignee: TDK Corporation, Tokyo (JP)

( * ) Notice: Subject to any disclaimer, the term of this patent is extended or adjusted under 35 U.S.C. 154(b) by 5 days.

(21) Appl. No.: 11/889,734

(22) Filed: Aug. 16, 2007

(65) Prior Publication Data

US 2008/0043401 A1 Feb. 21, 2008

(30) Foreign Application Priority Data

Aug. 21, 2006 (JP) .............................. 2006-224547

(51) Int. Cl.
*H01G 4/005* (2006.01)
*H01G 4/228* (2006.01)

(52) U.S. Cl. ........................................ 361/303; 361/309

(58) Field of Classification Search ................. 361/303, 361/306.1, 306.2, 306.3, 309, 311, 308.1, 361/328, 330, 301.2, 301.4
See application file for complete search history.

(56) References Cited

U.S. PATENT DOCUMENTS

| 5,083,237 | A | 1/1992 | Tsuji |
| 6,243,253 | B1 | 6/2001 | Dupre et al. |
| 7,085,124 | B2* | 8/2006 | Togashi ........................ 361/303 |
| 7,265,964 | B1* | 9/2007 | Togashi ........................ 361/303 |
| 7,411,775 | B2* | 8/2008 | Togashi ........................ 361/303 |
| 2003/0227738 | A1* | 12/2003 | Togashi ........................ 361/306.1 |
| 2006/0120017 | A1* | 6/2006 | Togashi ........................ 361/306.3 |
| 2006/0221546 | A1 | 10/2006 | Togashi |
| 2007/0025053 | A1* | 2/2007 | Takahashi ........................ 361/303 |
| 2007/0096254 | A1* | 5/2007 | Ritter et al. ........................ 257/532 |
| 2007/0165358 | A1* | 7/2007 | Togashi ........................ 361/302 |

FOREIGN PATENT DOCUMENTS

| JP | A-10-012490 | 1/1998 |
| JP | A 11-097291 | 4/1999 |
| JP | A-2006-147793 | 6/2006 |
| KR | 2006-055384 | 5/2006 |

* cited by examiner

*Primary Examiner*—Eric Thomas
*Assistant Examiner*—David M Sinclair
(74) *Attorney, Agent, or Firm*—Oliff & Berridge, PLC

(57) ABSTRACT

A feedthrough multilayer capacitor array having a capacitor body which has a plurality of insulator layers laminated, a first signal inner electrode connected to two first signal terminal electrodes, a second signal inner electrode connected to two second signal terminal electrodes, a first grounding inner electrode connected to one first grounding terminal electrode, and a second grounding inner electrode connected to one second grounding terminal electrode. The first signal inner electrode and second grounding inner electrode include respective portions opposing each other while holding therebetween at least one of the insulator layers. The second signal inner electrode and first grounding inner electrode include respective portions opposing each other while holding therebetween at least one of the insulator layers. The first and second signal inner electrodes include respective portions opposing each other while holding therebetween at least one of the insulator layers.

6 Claims, 12 Drawing Sheets

FEEDTHROUGH MULTILAYER CAPACITOR ARRAY

BACKGROUND OF THE INVENTION

1. Field of the Invention

The present invention relates to a feedthrough multilayer capacitor array.

2. Related Background Art

Conventionally known as a feed through capacitor array is one in which a plurality of signal inner electrodes and a plurality of grounding inner electrodes are laminated with insulator layers interposed therebetween, whereby a plurality of capacitors are formed along the laminating direction (see, for example, Japanese Patent Application Laid-Open No. HEI 11-97291).

SUMMARY OF THE INVENTION

In the feedthrough multilayer capacitor array described in Japanese Patent Application Laid-Open No. HEI 11-97291, however, only combinations of inner electrodes for signals and grounding form capacitors. Therefore, only feedthrough capacitors are formed in the feedthrough multilayer capacitor array described in Japanese Patent Application Laid-Open No. HEI 11-97291. Hence, no consideration for eliminating both common-mode noise and differential-mode noise is made in the feedthrough multilayer capacitor array described in Japanese Patent Application Laid-Open No. HEI 11-97291.

It is an object of the present invention to provide a feedthrough multilayer capacitor array which can eliminate both common-mode noise and differential-mode noise.

The present invention provides a feedthrough multilayer capacitor array comprising a capacitor body, at least two first signal terminal electrodes arranged on an outer surface of the capacitor body, at least two second signal terminal electrodes arranged on the outer surface of the capacitor body, at least one first grounding terminal electrode arranged on the outer surface of the capacitor body, and at least one second grounding terminal electrode arranged on the outer surface of the capacitor body; wherein the capacitor body has a plurality of insulator layers laminated, first and second signal inner electrodes, and first and second grounding inner electrodes; wherein the first signal inner electrode is connected to the at least two first signal terminal electrodes; wherein the second signal inner electrode is connected to the at least two second signal terminal electrodes; wherein the first grounding inner electrode is connected to the at least one first grounding terminal electrode; wherein the second grounding inner electrode is connected to the at least one second grounding terminal electrode; wherein the first signal inner electrode and second grounding inner electrode include respective portions opposing each other while holding therebetween at least one of the plurality of insulator layers; wherein the second signal inner electrode and first grounding inner electrode include respective portions opposing each other while holding therebetween at least one of the plurality of insulator layers; and wherein the first and second signal inner electrodes include respective portions opposing each other while holding therebetween at least one of the plurality of insulator layers.

The above-mentioned feedthrough multilayer capacitor array has not only capacitors formed by signal and grounding inner electrodes opposing each other, but also capacitors formed by signal inner electrodes opposing each other. The capacitors formed by the signal and grounding inner electrodes function as capacitors for eliminating common-mode noise. On the other hand, the capacitors formed by the signal inner electrodes function as capacitors for eliminating differential-mode noise. Therefore, this feedthrough multilayer capacitor array can eliminate both common-mode noise and differential-mode noise. Since all the signal inner electrodes penetrate through the array, namely all the signal inner electrodes are connected to two terminal electrodes respectively, equivalent series inductance (ESL) can be lowered. Also, in this feedthrough multilayer capacitor array, the first and second signal inner electrodes have respective portions opposing each other while holding an insulator layer therebetween. As a consequence, current flow paths increase as compared with the case where the first and second signal inner electrodes do not oppose each other while holding an insulator layer therebetween as in the conventional capacitor array. This can reduce the equivalent series inductance.

Preferably, the first signal inner electrode and first grounding inner electrode are arranged on the same insulator layer in the plurality of insulator layers, the second signal inner electrode and second grounding inner electrode are arranged on the same insulator layer in the plurality of insulator layers, and the insulator layer having the first signal inner electrode and first grounding inner electrode arranged thereon and the insulator layer having the second signal inner electrode and second grounding inner electrode arranged thereon differ from each other. In this case, it becomes feasible to manufacture a feedthrough multilayer capacitor array by forming a conductor pattern corresponding to both the signal and grounding inner electrodes on one ceramic green sheet. Therefore, the feedthrough multilayer capacitor array can be manufactured efficiently.

Preferably, the at least one insulator layer held between the first signal inner electrode and second grounding inner electrode, the at least one insulator layer held between the second signal inner electrode and first grounding inner electrode, and the at least one insulator layer held between the first and second signal inner electrodes are the same. In this case, the first and second signal inner electrodes and the first and second grounding inner electrodes are arranged such as to hold the same insulator layer therebetween, whereby characteristics of capacitors included in the feedthrough multilayer capacitor array can be regulated easily.

Preferably, one of the at least two first signal terminal electrodes and one of the at least two second signal terminal electrodes are arranged on the same side face in the outer surface of the capacitor body, while the other of the at least two first signal terminal electrodes and the other of the at least two second signal terminal electrodes are arranged on the same side face in the outer surface of the capacitor body. When the first and second signal terminal electrodes are connected to heteropolar land patterns and the like in this case, the current flowing through the first signal inner electrode and the current flowing through the second signal inner electrode can be directed opposite to each other. This can reduce the equivalent series inductance.

Preferably, at least three each of the first and second signal terminal electrodes are provided, the first signal inner electrode is connected to the at least three first signal terminal electrodes, and the second signal inner electrode is connected to the at least three second signal terminal electrodes. This increases paths for currents flowing into and out of the signal inner electrodes, thereby further reducing the equivalent series inductance.

The present invention can provide a feedthrough multilayer capacitor array which can eliminate both common-mode noise and differential-mode noise.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, preferred embodiments will be explained in detail with reference to the accompanying drawings. In the explanation, the same constituents or those having the same functions will be referred to with the same numerals while omitting their overlapping descriptions.

First Embodiment

Figure 1:
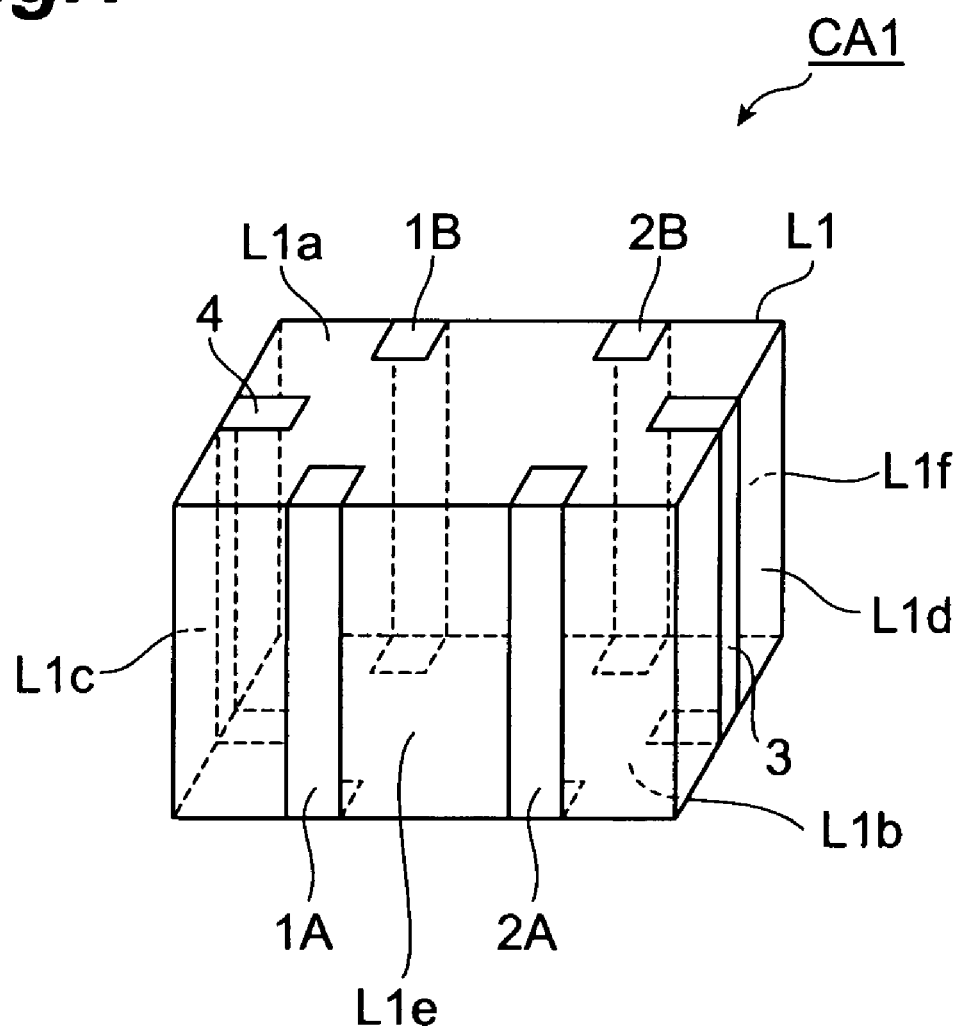
FIG. 1 is a perspective view of the feedthrough multilayer capacitor array in accordance with a first embodiment.
Figure 2:
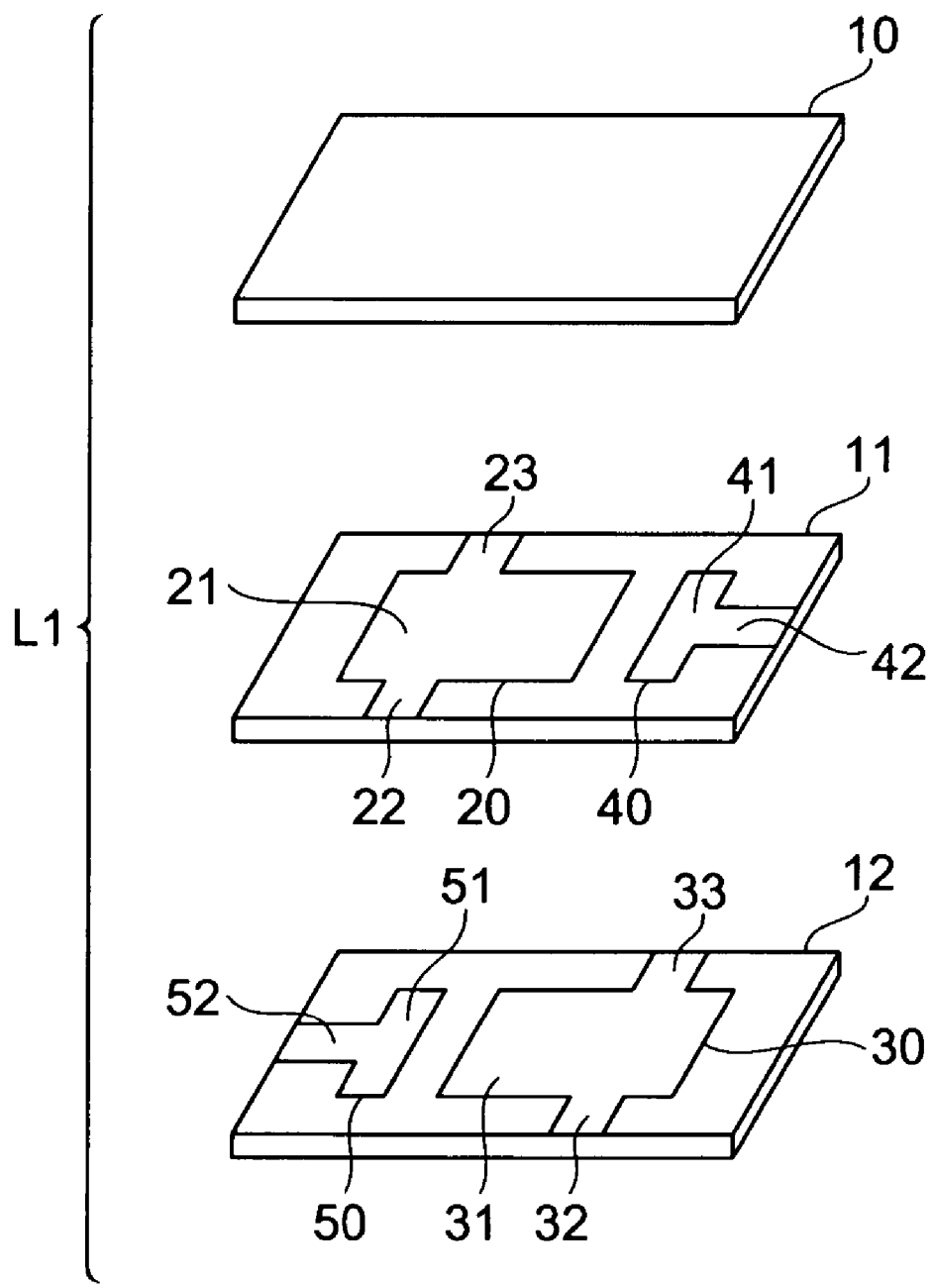
FIG. 2 is an exploded perspective view of the capacitor body included in the feedthrough multilayer capacitor array in accordance with the first embodiment.

With reference to FIGS. 1 and 2, the structure of feedthrough multilayer capacitor array CA1 in accordance with a first embodiment will be explained. FIG. 1 is a perspective view of the feedthrough multilayer capacitor array in accordance with the first embodiment. FIG. 2 is an exploded perspective view of the capacitor body included in the feedthrough multilayer capacitor array in accordance with the first embodiment.

As shown in FIG. 1, the feedthrough multilayer capacitor array CA1 comprises a capacitor body L1 having a substantially rectangular parallelepiped form, first and second signal terminal electrodes 1A, 1B, 2A, 2B formed on the outer surface of the capacitor body L1, and first and second grounding terminal electrodes 3, 4. The capacitor body L1 includes first and second side faces L1a, L1b opposing each other and corresponding to main faces of the substantially rectangular parallelepiped, third and fourth side faces L1c, L1d opposing each other and extending along the shorter side direction of the first and second side faces L1a, L1b, and fifth and sixth side faces L1e, L1f opposing each other and extending in the longer side direction of the first and second side faces L1a, L1b. The third and fourth side faces L1c, L1d and the fifth and sixth side faces L1e, L1f extend so as to connect the first and second side faces L1a and L1b to each other.

The fifth side face L1e of the capacitor body L1 is formed with the first signal terminal electrode 1A and the second signal terminal electrode 2A. The first signal terminal electrode 1A and second signal terminal electrode 2A are positioned in the order of the first signal terminal electrode 1A and second signal terminal electrode 2A in the direction from the third side face L1c to the fourth side face L1d. The sixth side face L1f of the capacitor body L1 is formed with the first signal terminal electrode 1B and the second signal terminal electrode 2B. The first signal terminal electrode 1B and second signal terminal electrode 2B are positioned in the order of the first signal terminal electrode 1B and second signal terminal electrode 2B in the direction from the third side face L1c to the fourth side face L1d.

The first signal terminal electrodes 1A, 1B oppose each other in the direction in which the fifth and sixth side faces L1e, L1f oppose each other. The second signal terminal electrodes 2A, 2B oppose each other in the direction in which the fifth and sixth side faces L1e, L1f oppose each other.

The third side face L1c of the capacitor body L1 is formed with the second grounding terminal electrode 4. The fourth side face L1d of the capacitor body L1 is formed with the first grounding terminal electrode 3. The first and second grounding terminal electrodes 3, 4 oppose each other in the direction in which the third and fourth side faces L1c, L1d oppose each other.

Each of the first and second signal terminal electrodes 1A, 1B, 2A, 2B and first and second grounding terminal electrodes 3, 4 is formed, for example, by applying and baking a conductive paste, which contains a conductive metal powder and a glass frit, onto the outer surface of the capacitor body L1. A plating layer may be formed on the baked electrodes when necessary.

The capacitor body L1 has a plurality of (3 in this embodiment) insulator layers 10 to 12 laminated, a first signal inner electrode 20, a first grounding inner electrode 40, a second signal inner electrode 30, and a second grounding inner electrode 50. Each of the insulator layers 10 to 12 extends in a direction parallel to the first and second side faces L1a, L1b. In the capacitor body L1, the first side face L1a and second side face L1b oppose each other in the laminating direction of the plurality of insulator layers 10 to 12.

Each of the insulator layers 10 to 12 is constituted by a sintered body of a ceramic green sheet including a dielectric ceramic, for example. In the actual feedthrough multilayer capacitor array CA1, the insulator layers 10 to 12 are integrated to such an extent that their boundaries are indiscernible. Each of the inner electrodes 20, 30, 40, 50 is constituted by a sintered body of a conductive paste.

The first signal inner electrode 20 and second grounding inner electrode 50 are arranged such as to include respective portions opposing each other while holding therebetween the insulator layer 11, which is one of the plurality of insulator layers 10 to 12. The second signal inner electrode 30 and first grounding inner electrode 40 are arranged such as to include respective portions opposing each other while holding therebetween the insulator layer 11, which is one of the plurality of insulator layers 10 to 12. The first and second signal inner electrodes 20, 30 are arranged such as to include respective portions opposing each other while holding therebetween the insulator layer 11, which is one of the plurality of insulator layers 10 to 12.

As shown in FIG. 2, the first signal inner electrode 20 is arranged within the same plane as the first grounding inner electrode 40. Namely, the first signal inner electrode 20 and first grounding inner electrode 40 are arranged on the same insulator layer 11 in the plurality of insulator layers 10 to 12. While being separated by a predetermined distance from each other, the first signal inner electrode 20 and first grounding inner electrode 40 are arranged in a row in the direction in which the third side face L1c and fourth side face L1d oppose each other. The first signal inner electrode 20 and first grounding inner electrode 40 are electrically insulated from each other.

As shown in FIG. 2, the second signal inner electrode 30 is arranged within the same plane as the second grounding inner electrode 50. Namely, the second signal inner electrode 30 and second grounding inner electrode 50 are arranged on the same insulator layer 12 in the plurality of insulator layers 10 to 12. The second signal inner electrode 30 and second grounding inner electrode 50 are arranged on the insulator layer 12 different from the insulator layer 11 on which the first signal inner electrode 20 and first grounding inner electrode 40 are arranged. While being separated by a predetermined distance from each other, the second signal inner electrode 30 and second grounding inner electrode 50 are arranged in a row in the direction in which the third side face L1c and fourth side face L1d oppose each other. The second signal inner electrode 30 and second grounding inner electrode 50 are electrically insulated from each other.

The same insulator layer 11 is held between the first signal inner electrode 20 and second grounding inner electrode 50, between the second signal inner electrode 30 and first grounding inner electrode 40, and between the first and second signal inner electrodes 20, 30.

The first signal inner electrode 20 includes a main electrode portion 21 having a quadrangular form whose four sides are parallel to the third, fourth, fifth, and sixth side faces L1c, L1d, L1e, L1f, respectively, a lead portion 22 extending from the main electrode portion 21 so as to reach the fifth side face L1e, and a lead portion 23 extending from the main electrode portion 21 so as to reach the sixth side face L1f. The first signal inner electrode 20 penetrates through the capacitor body L1 from the fifth side face L1e to the sixth side face L1f.

The main electrode portion 21 is separated not only from the first grounding inner electrode 40 by a predetermined distance as mentioned above, but also from the third, fourth, fifth, and sixth side faces L1c, L1d, L1e, L1f by predetermined distances. The lead portion 22 is drawn to the fifth side face L1e, so as to be connected to the first signal terminal electrode 1A electrically and physically. The lead portion 23 is drawn to the sixth side face L1f, so as to be connected to the first signal terminal electrode 1B electrically and physically.

As a consequence, the first signal inner electrode 20 is electrically connected to the first signal terminal electrodes 1A, 1B.

The first grounding inner electrode 40 includes a quadrangular main electrode portion 41 whose four sides are parallel to the third, fourth, fifth, and sixth side faces L1c, L1d, L1e, L1f, respectively, and a lead portion 42 extending from the main electrode portion 41 so as to reach the fourth side face L1d.

The main electrode portion 41 is separated not only from the first signal inner electrode 20 by a predetermined distance as mentioned above, but also from the third, fourth, fifth, and sixth side faces L1c, L1d, L1e, L1f by predetermined distances. The lead portion 42 is drawn to the fourth side face L1d, so as to be connected to the first grounding terminal electrode 3 electrically and physically. As a consequence, the first grounding inner electrode 40 is electrically connected to the first grounding terminal electrode 3.

The second signal inner electrode 30 includes a quadrangular main electrode portion 31 whose four sides are parallel to the third, fourth, fifth, and sixth side faces L1c, L1d, L1e, L1f, a lead portion 32 extending from the main electrode portion 31 so as to reach the fifth side face L1e, and a lead portion 33 extending from the main electrode portion 31 so as to reach the sixth side face L1f. The second signal inner electrode 30 penetrates through the capacitor body L1 from the fifth side face L1e to the sixth side face L1f.

The main electrode portion 31 is separated not only from the second grounding inner electrode 50 by a predetermined distance as mentioned above, but also from the third, fourth, fifth, and sixth side faces L1c, L1d, L1e, L1f by predetermined distances. The lead portion 32 is drawn to the fifth side face L1e, so as to be connected to the second signal terminal electrode 2A electrically and physically. The lead portion 33 is drawn to the sixth side face L1f, so as to be connected to the second signal terminal electrode 2B electrically and physically. As a consequence, the second signal inner electrode 30 is electrically connected to the second signal terminal electrodes 2A, 2B.

The second grounding inner electrode 50 includes a quadrangular main electrode portion 51 whose four sides are parallel to the third, fourth, fifth, and sixth side faces L1c, L1d, L1e, L1f, respectively, and a lead portion 52 extending from the main electrode portion 51 so as to reach the third side face L1c.

The main electrode portion 51 is separated not only from the second signal inner electrode 30 by a predetermined distance as mentioned above, but also from the third, fourth, fifth, and sixth side faces L1c, L1d, L1e, L1f by predetermined distances. The lead portion 52 is drawn to the third side face L1c, so as to be connected to the second grounding terminal electrode 4 electrically and physically. As a consequence, the second grounding inner electrode 50 is electrically connected to the second grounding terminal electrode 4.

Figure 3:
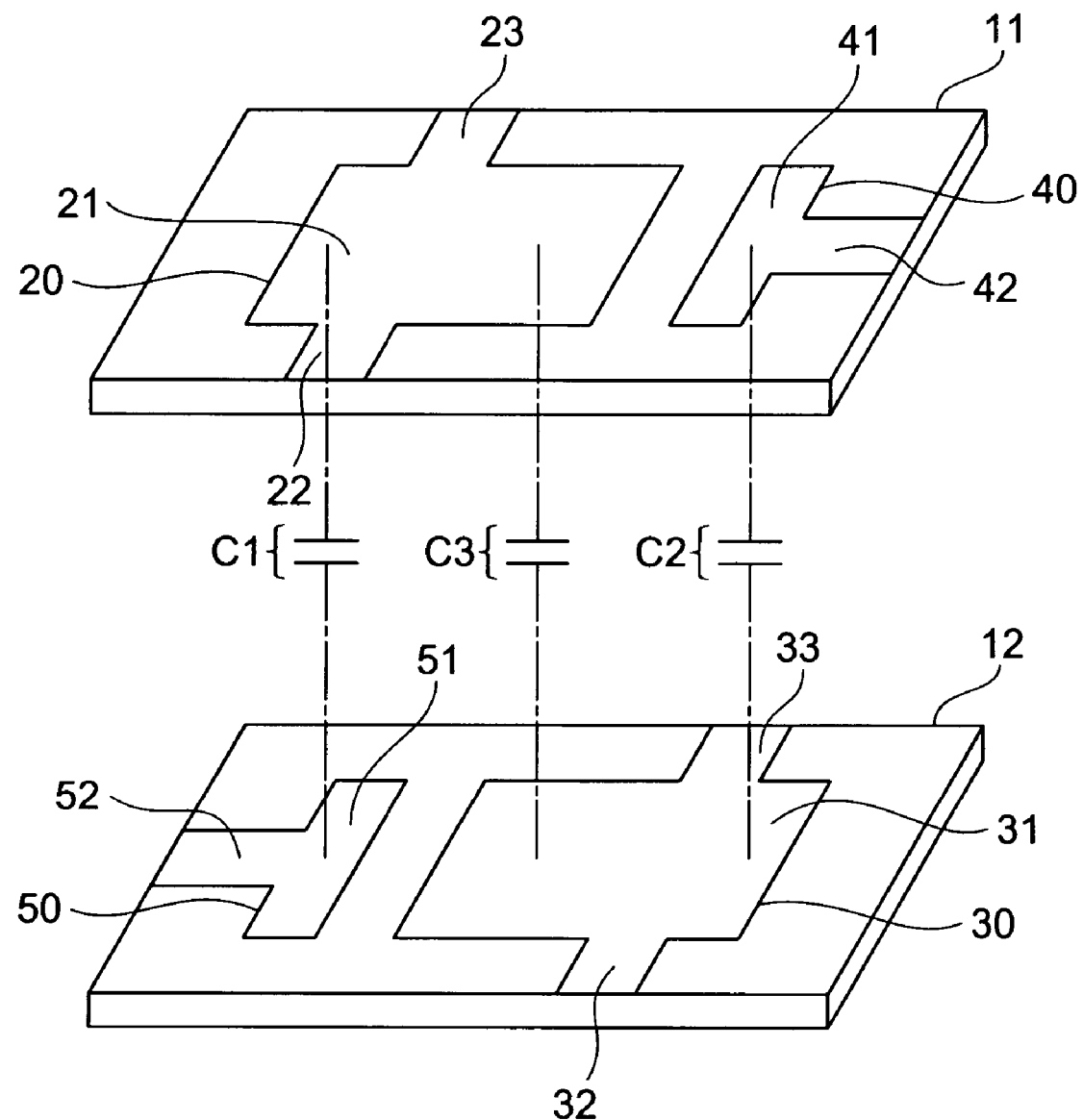
FIG. 3 is a view for explaining the fact that the inner electrodes owned by the capacitor body have portions opposing each other.

The fact that the inner electrodes 20, 30, 40, 50 owned by the capacitor body L1 have portions opposing each other will be explained with reference to FIG. 3. FIG. 3 is a view for explaining the fact that the inner electrodes 20, 30, 40, 50 owned by the capacitor body L1 have portions opposing each other.

As shown in FIG. 3, the main electrode portion 21 of the first signal inner electrode 20 and the main electrode portion 51 of the second grounding inner electrode 50 have respective portions opposing each other while holding the insulator layer 11 therebetween. The portions by which the first signal inner electrode 20 and the second grounding inner electrode 50 oppose each other form a first capacitor C1.

As shown in FIG. 3, the main electrode portion 31 of the second signal inner electrode 30 and the main electrode portion 41 of the first grounding inner electrode 40 have respective portions opposing each other while holding the insulator layer 11 therebetween. The portions by which the second signal inner electrode 30 and the first grounding inner electrode 40 oppose each other form a second capacitor C2.

As shown in FIG. 3, the main electrode portion 21 of the first signal inner electrode 20 and the main electrode portion 31 of the second signal inner electrode 30 have respective portions opposing each other while holding the insulator layer 11 therebetween. The portions by which the first and second signal inner electrodes 20, 30 oppose each other form a third capacitor C3.

Figure 4:
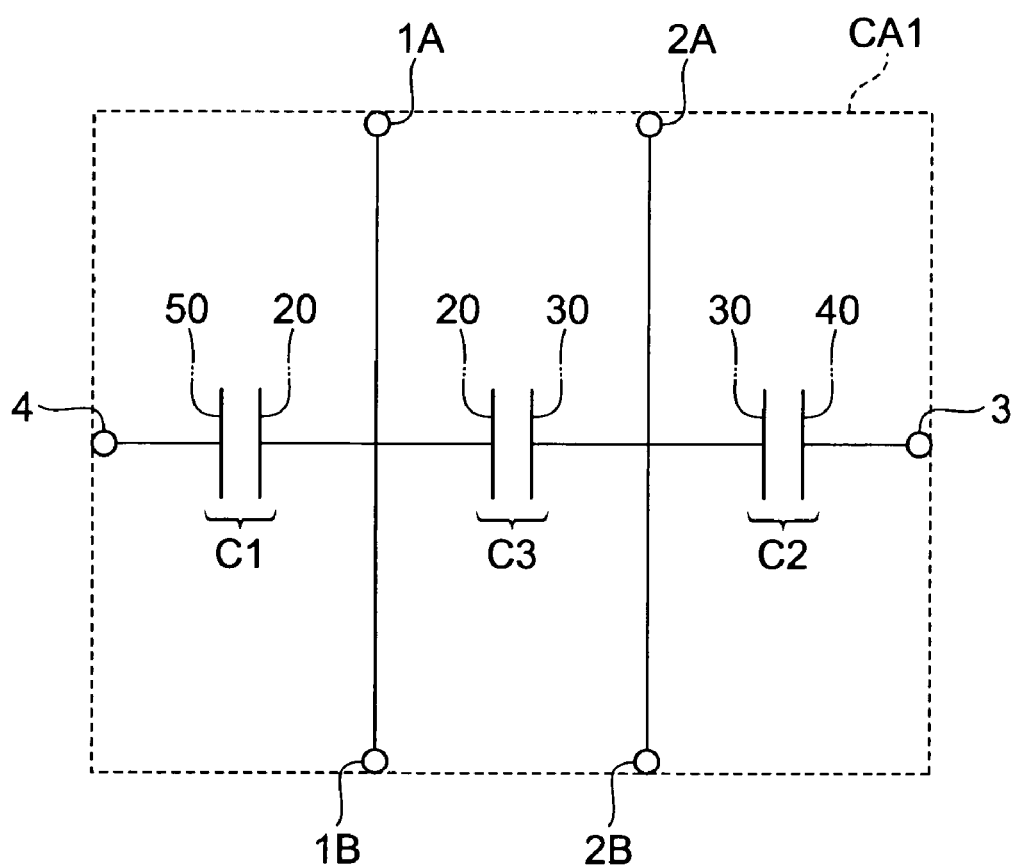
FIG. 4 is an equivalent circuit diagram of the feedthrough multilayer capacitor array in accordance with the first embodiment.

Thus, three capacitors C1, C2, C3 are formed in the feedthrough multilayer capacitor array CA1 as shown in FIG. 4. FIG. 4 is an equivalent circuit diagram of the feedthrough multilayer capacitor array in accordance with the first embodiment.

Figure 5:
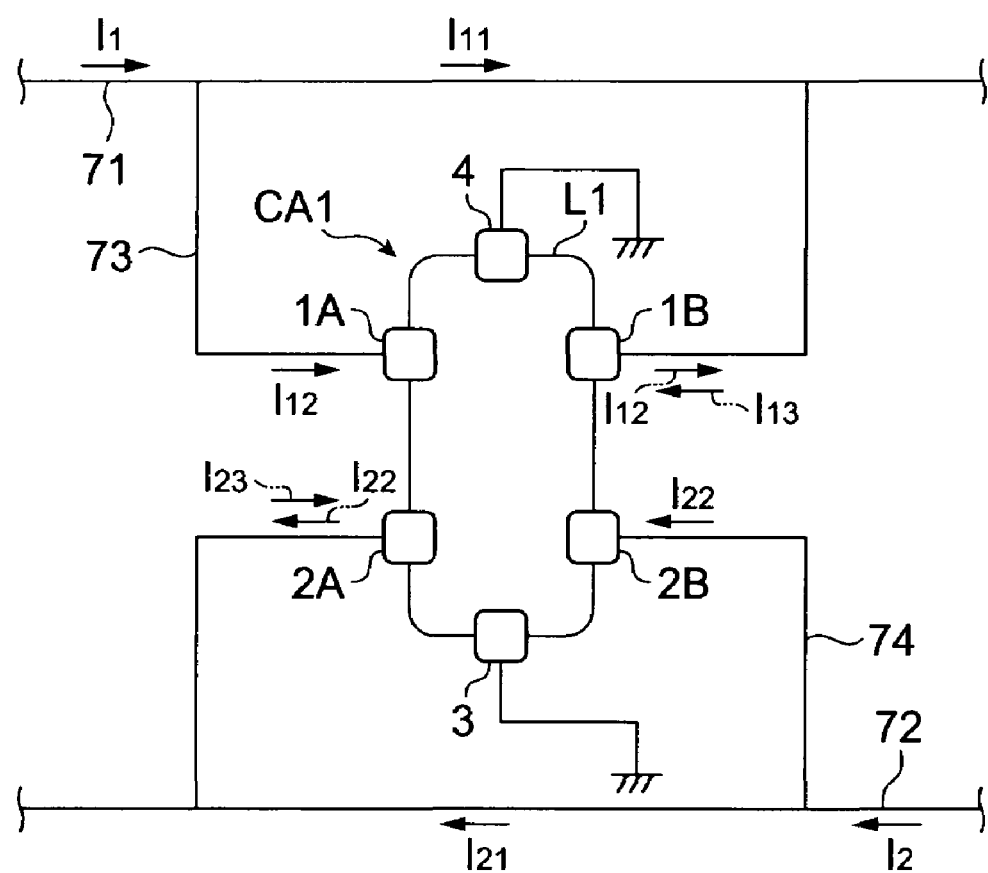
FIG. 5 is a diagram showing an example in which the feedthrough multilayer capacitor array in accordance with the first embodiment is connected to a circuit.

FIG. 5 shows an example in which the feedthrough multilayer capacitor array CA1 is connected to a circuit. In the example shown in FIG. 5, the feedthrough multilayer capacitor array CA1 is connected to lines 73, 74 branching out of main lines 71, 72, respectively. Specifically, the first signal terminal electrodes 1A, 1B are connected to the line 73, while the second signal terminal electrodes 2A, 2B are connected to the lead 74. The first and second grounding terminal electrodes 3, 4 are grounded.

Figure 6:
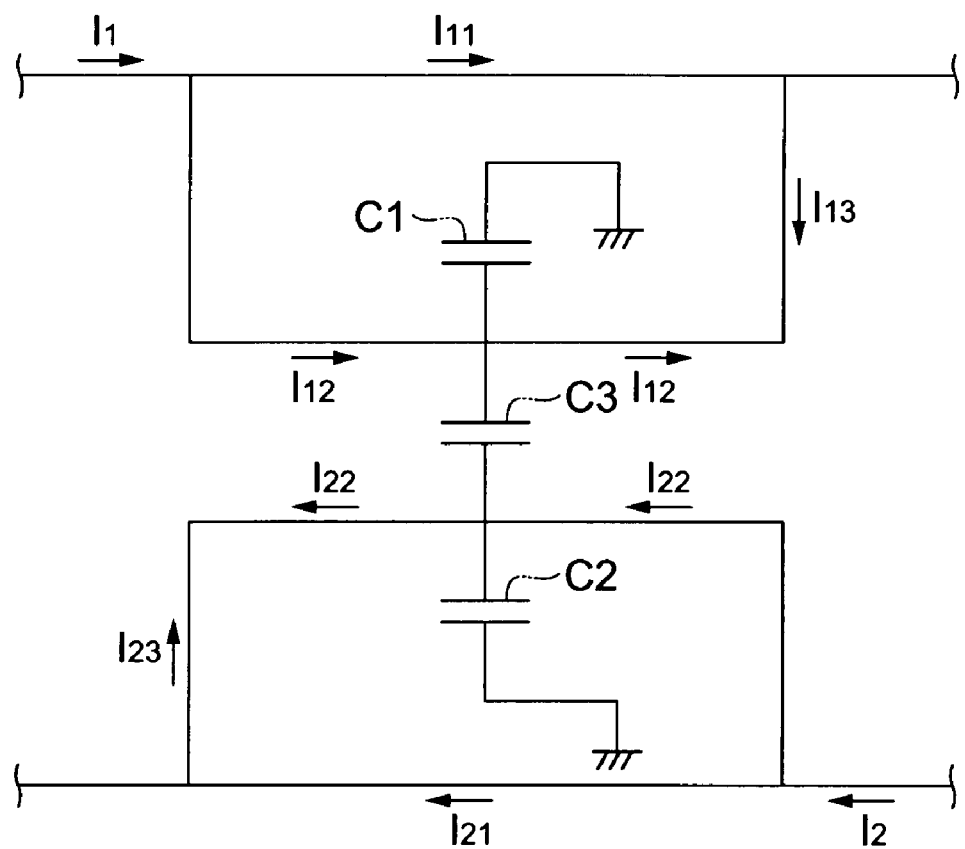
FIG. 6 is an equivalent circuit diagram in the case where the feedthrough multilayer capacitor array is connected to a circuit as shown in FIG. 5.

Currents $I_1$, $I_2$ flow through the main lines 71, 72, respectively. Currents $I_{12}$, $I_{22}$ flow through the branch lines 73, 74, respectively. Currents $I_{11}$, $I_{21}$ flow through the main leads 71, 72 downstream their branch points, respectively. In this case, there is a current $I_{13}$ flowing back from the main lead 71 to the lead 73 at the branch point between the leads 71 and 73. On the other hand, there is a current $I_{23}$ flowing back from the main lead 72 to the lead 74 at the branch point between the leads 72 and 74. FIG. 6 shows an equivalent circuit diagram in the case where the feedthrough multilayer capacitor array CA1 is connected to the circuit as shown in FIG. 5. This example of connection is suitable in cases where large currents flow.

Figure 7:
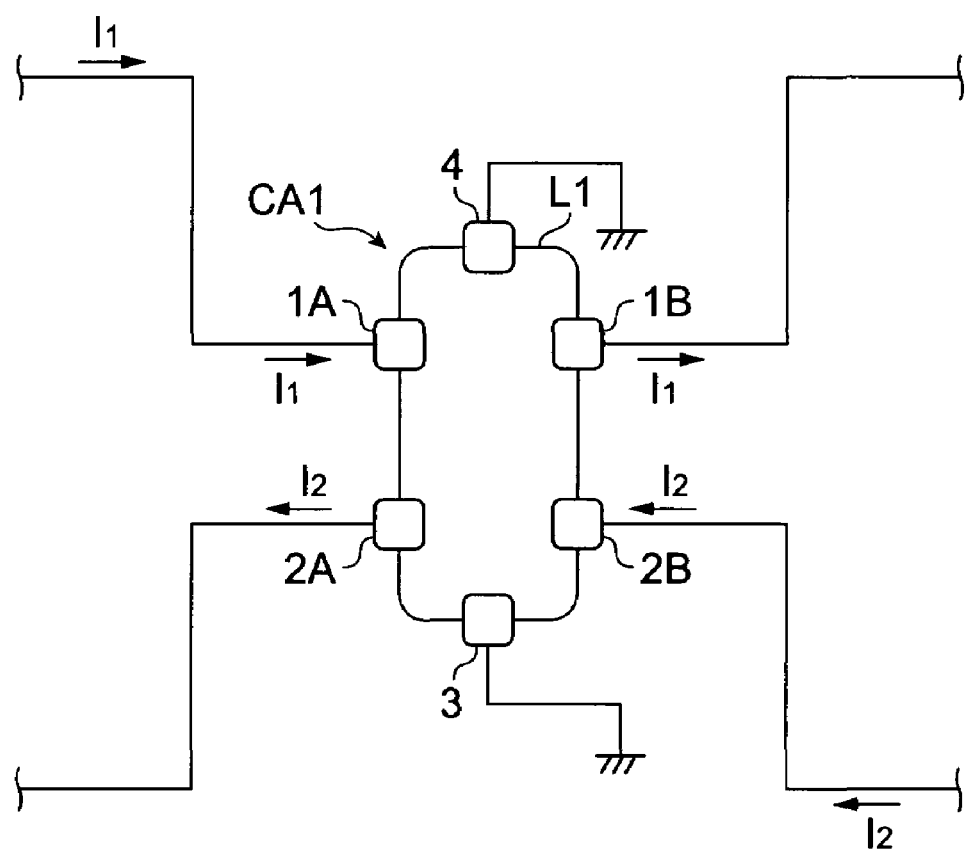
FIG. 7 is a diagram showing an example in which the feedthrough multilayer capacitor array in accordance with the first embodiment is connected to a circuit.
Figure 8:
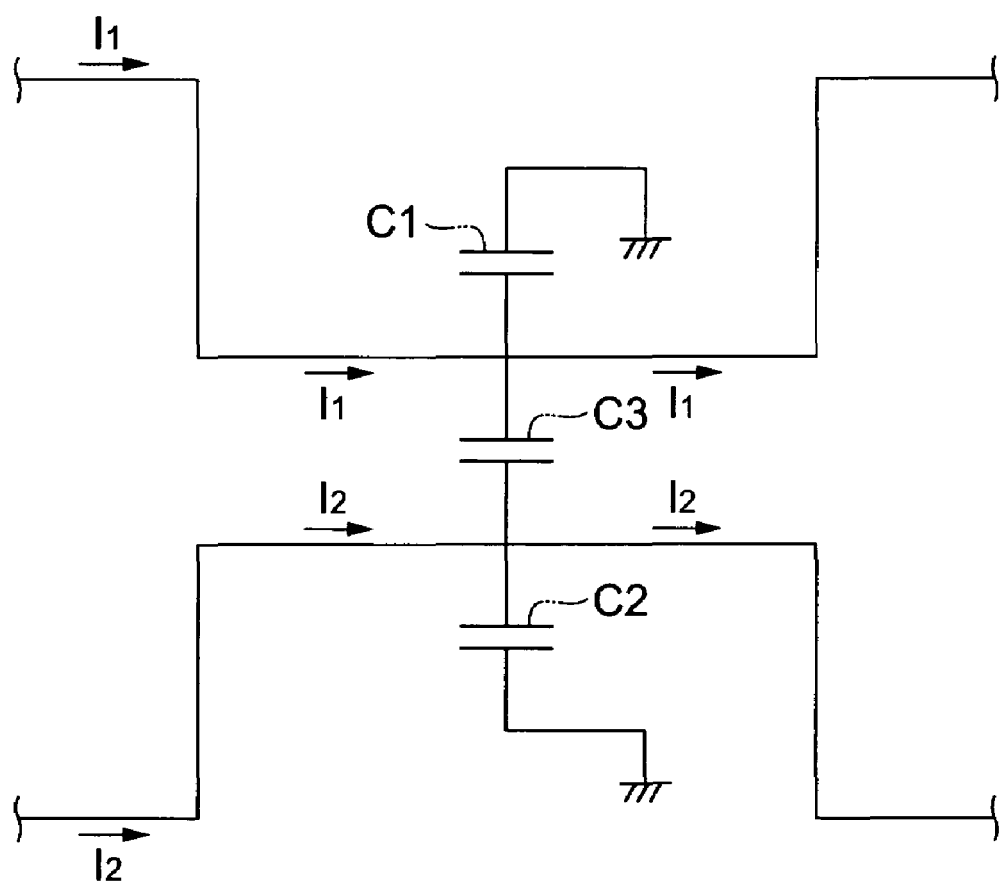
FIG. 8 is an equivalent circuit diagram in the case where the feedthrough multilayer capacitor array is connected to a circuit as shown in FIG. 7.

FIG. 7 shows another example in which the feedthrough multilayer capacitor array CA1 is connected to a circuit. In the example shown in FIG. 7, the feedthrough multilayer capacitor array CA1 is connected to main lines 71, 72 having no branches. Specifically, the first signal terminal electrodes 1A, 1B are connected to the line 71, while the second signal terminal electrodes 2A, 2B are connected to the line 72. The first and second grounding terminal electrodes 3, 4 are grounded. Currents $I_1$, $I_2$ flow through the main leads 71, 72, respectively. FIG. 8 shows an equivalent circuit diagram in the case where the feedthrough multilayer capacitor array CA1 is connected to the circuit as shown in FIG. 7.

The feedthrough multilayer capacitor array CA1 has not only the first capacitor C1 formed by the first signal inner electrode 20 and second grounding inner electrode 50 opposing each other and the second capacitor C2 formed by the second signal inner electrode 30 and first grounding inner electrode 40 opposing each other, but also the third capacitor C3 formed by the first and second signal inner electrodes 20, 30 opposing each other. The first and second capacitors C1, C2 formed by the signal inner electrodes 20, 30 and grounding inner electrodes 40, 50 function as capacitors for eliminating common-mode noise. On the other hand, the third capacitor C3 formed by the first and second signal inner electrodes 20, 30 functions as a capacitor for eliminating differential-mode noise. Therefore, the feedthrough multilayer capacitor array CA1 can eliminate both common-mode noise and differential-mode noise.

Since each of the first and second signal inner electrodes 20, 30 penetrates through the feedthrough multilayer capacitor array CA1, namely each of the first and second signal inner electrodes 20, 30 is connected to the corresponding two signal terminal electrodes, equivalent series inductance (ESL) can be lowered.

In the feedthrough multilayer capacitor array CA1, the first and second signal inner electrodes 20, 30 have respective portions opposing each other while holding the insulator layer 11 therebetween. This can increase current flow paths as compared with the case where the first and second signal inner electrodes do not oppose each other while holding an insulator layer therebetween as in the conventional capacitor array. As a consequence, the feedthrough multilayer capacitor array CA1 can reduce the equivalent series inductance.

In particular, the feedthrough multilayer capacitor array CA1 has two kinds of grounding inner electrodes 40, 50 which oppose their corresponding signal inner electrodes 20, 30. This further increases the current flow paths, whereby the feedthrough multilayer capacitor array CA1 can further reduce the equivalent series inductance.

The first signal inner electrode 20 and first grounding inner electrode 40 are positioned on the same insulator layer 11. The second signal inner electrode 30 and second grounding inner electrode 50 are positioned on the same insulator layer 12. Therefore, when each of the insulator layers 10 to 12 is constituted by a sintered body of a ceramic green sheet, for example, the first signal inner electrode 20 and first grounding inner electrode 40 can be formed on the same ceramic green sheet by a conductive paste, and the second signal inner electrode 30 and second grounding inner electrode 50 can be formed on the same ceramic green sheet by a conductive paste. Namely, only two kinds of ceramic green sheets with conductor patterns are needed to be prepared for making the capacitor body L1 having four kinds of inner electrodes 20, 30, 40, 50. As a result, the capacitor body L1 can be manufactured efficiently.

The same insulator layer 11 is held between the first signal inner electrode 20 and second grounding inner electrode 50, between the second signal inner electrode 30 and first grounding inner electrode 40, and between the first and second signal inner electrodes 20, 30. Since the same insulator layer 11 constitutes the capacitors C1, C2, C3 included in the feedthrough multilayer capacitor array CA1, characteristics of the capacitors C1, C2, C3 can be regulated easily.

The first signal terminal electrode 1A and second signal terminal electrode 2A are arranged on the fifth side face L1e, which is the same side face of the capacitor body L1. The first signal terminal electrode 1B and second signal terminal electrode 2B are arranged on the sixth side face L1f, which is the same side face of the capacitor body L1. Therefore, when the first signal terminal electrodes 1A, 1B and second signal terminal electrodes 2A, 2B are connected to heteropolar land patterns and the like, the current flowing through the first signal inner electrode 20 and the current flowing through the second signal inner electrode 30 are directed opposite to each other. Also, the first signal inner electrode 20 and second signal inner electrode 30 oppose each other while holding the insulator layer 11 therebetween. Therefore, a magnetic field obtained by the current flowing through the first signal inner electrode 20 and a magnetic field obtained by the current flowing through the second signal inner electrode 30 cancel each other out, whereby equivalent series inductance can be reduced.

Figure 9:
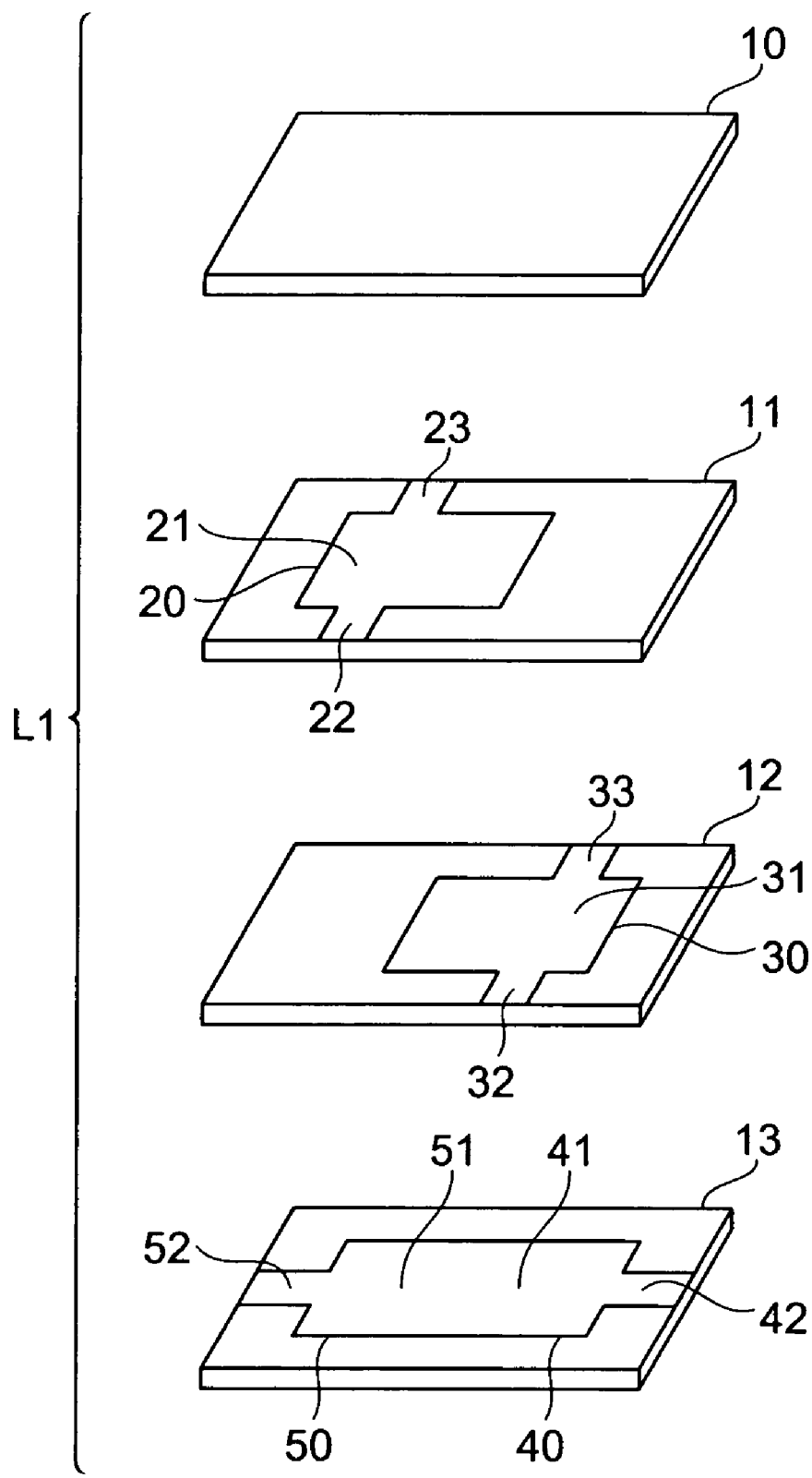
FIG. 9 is an exploded perspective view of the capacitor body included in a modified example of the feedthrough multilayer capacitor array in accordance with the first embodiment.

The structure of a modified example of the feedthrough multilayer capacitor array CA1 in accordance with the first embodiment will now be explained with reference to FIG. 9. FIG. 9 is an exploded perspective view of the capacitor body L1 included in the modified example of the feedthrough multilayer capacitor array in accordance with the first embodiment. The feedthrough multilayer capacitor array in accordance with the modified example shown in FIG. 9 differs from the feedthrough multilayer capacitor array CA1 in accordance with the above-mentioned first embodiment in that the first and second grounding inner electrodes are formed integrally.

The capacitor body L1 included in the feedthrough multilayer capacitor array in accordance with the modified example has a plurality of (4 in this embodiment) insulator layers 10 to 13 laminated, a first signal inner electrode 20, a second signal inner electrode 30, and first and second grounding inner electrodes 40, 50 formed integrally.

The first signal inner electrode 20 and second grounding inner electrode 50 have respective portions opposing each other while holding the insulator layers 11, 12 therebetween. The second signal inner electrode 30 and first grounding inner electrode 40 have respective portions opposing each other while holding the insulator layer 12 therebetween. The first and second signal inner electrodes 20, 30 have respective portions opposing each other while holding the insulator layer 11 therebetween.

In the first and second grounding inner electrodes 40, 50 formed integrally, the main electrode portions 41, 51 of the grounding inner electrodes 40, 50 are integrated, so as to yield a quadrangular form whose four sides are parallel to the third, fourth, fifth, and sixth side faces L1c, L1d, L1e, L1f, respectively. The integrally formed first and second grounding inner electrodes 40, 50 penetrate through the capacitor body L1 from the third side face L1c to the fourth side face L1d and are connected to the two grounding terminal electrodes 3, 4.

Second Embodiment

Figure 10:
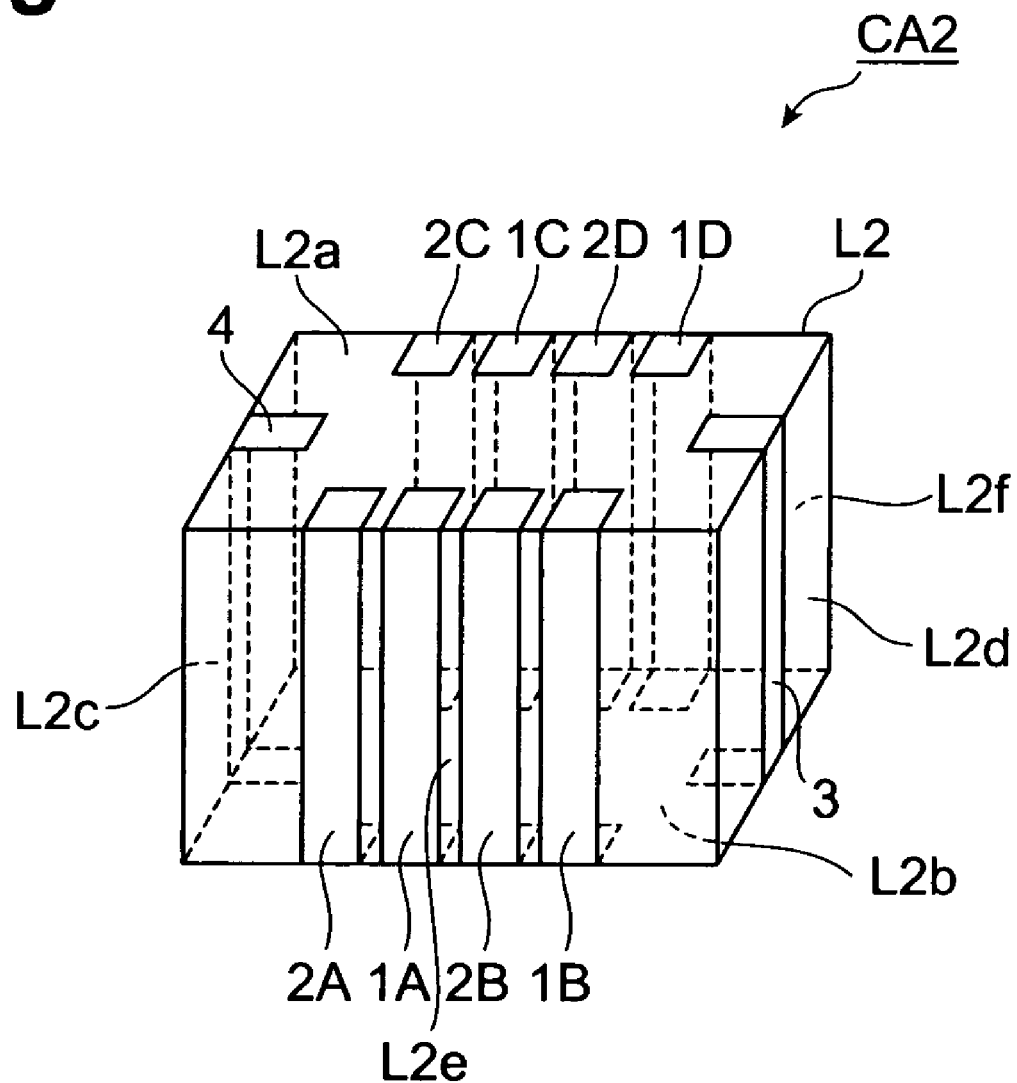
FIG. 10 is a perspective view of the feedthrough multilayer capacitor array in accordance with a second embodiment.
Figure 11:
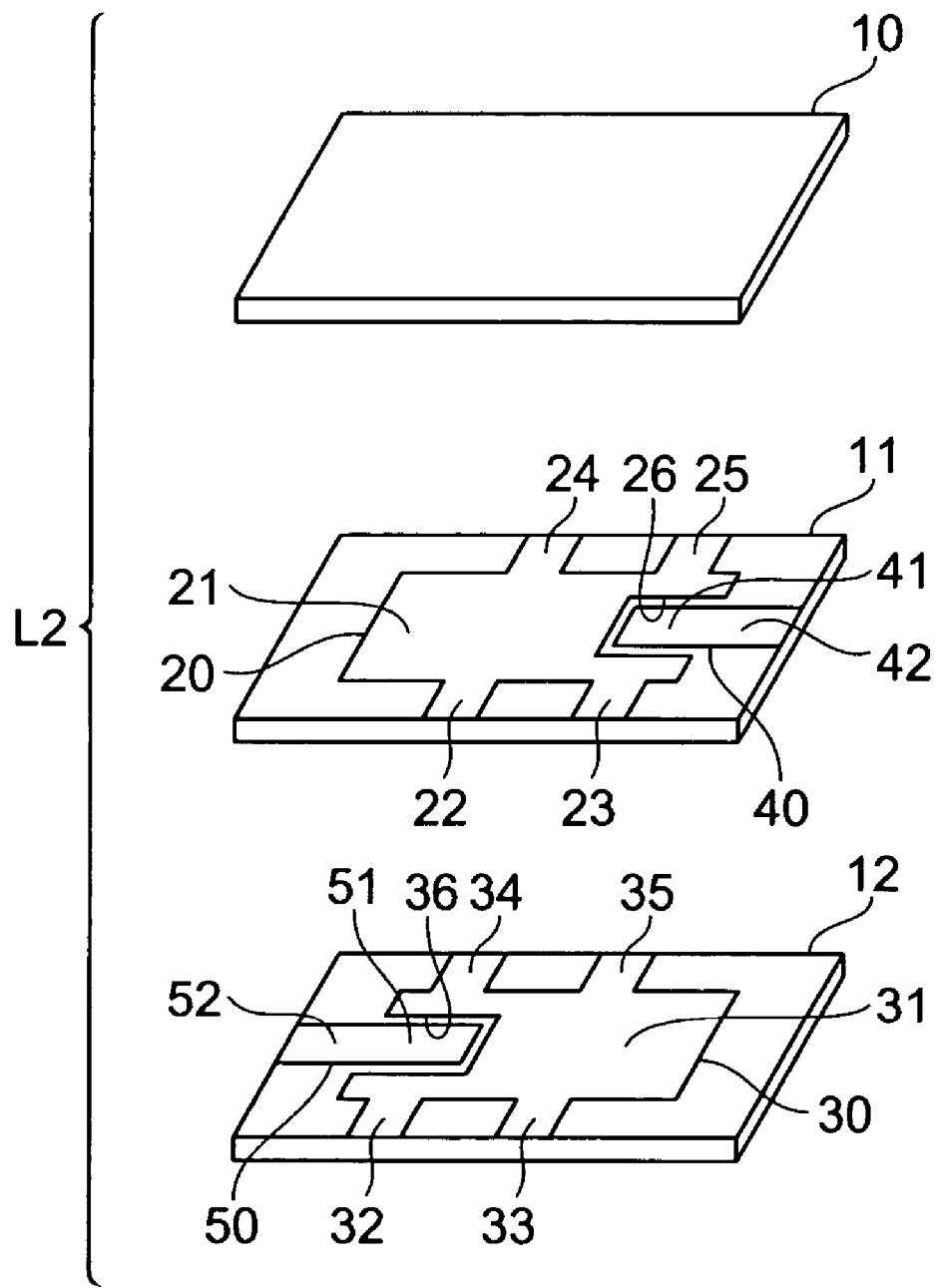
FIG. 11 is an exploded perspective view of the capacitor body included in the feedthrough multilayer capacitor array in accordance with the second embodiment.

With reference to FIGS. 10 and 11, the structure of feedthrough multilayer capacitor array CA2 in accordance with a second embodiment will be explained. The feedthrough multilayer capacitor array CA2 in accordance with the second embodiment differs from the feedthrough multilayer capacitor array CA1 in accordance with the first embodiment in terms of the number of signal terminal electrodes in each species. FIG. 10 is a perspective view of the feedthrough multilayer capacitor array in accordance with the second embodiment. FIG. 11 is an exploded perspective view of the capacitor body included in the feedthrough multilayer capacitor array in accordance with the second embodiment.

As shown in FIG. 10, the feedthrough multilayer capacitor array CA2 comprises a capacitor body L2, and first and second signal terminal electrodes 1A to 1D, 2A to 2D and first and second grounding terminal electrodes 3, 4 which are formed on the outer surface of the capacitor body L2.

The capacitor body L2 includes first and second side faces L2a, L2b opposing each other and corresponding to main faces of a substantially rectangular parallelepiped, third and fourth side faces L2c, L2d opposing each other and extending in the shorter side direction of the first and second side faces L2a, L2b, and fifth and sixth side faces L2e, L2f opposing each other and extending in the longer side direction of the first and second side faces L2a, L2b.

The fifth side face L2e of the capacitor body L2 is formed with first signal terminal electrodes 1A, 1B and second signal terminal electrodes 2A, 2B. The first signal terminal electrodes 1A, 1B and second signal terminal electrodes 2A, 2B are positioned in the order of the second signal terminal electrode 2A, first signal terminal electrode 1A, second signal terminal electrode 2B, and first signal terminal electrode 1B in the direction from the third side face L2c to the fourth side face 2d.

The sixth side face L2f of the capacitor body L2 is formed with first signal terminal electrodes 1C, 1D and second signal terminal electrodes 2C, 2D. The first signal terminal electrodes 1C, 1D and second signal terminal electrodes 2C, 2D are positioned in the order of the second signal terminal electrode 2C, first signal terminal electrode 1C, second signal terminal electrode 2D, and first signal terminal electrode 1D in the direction from the third side face L2c to the fourth side face L2d.

The first signal terminal electrodes 1A, 1C oppose each other in the direction in which the fifth and sixth side faces L2e, L2f oppose each other. The first signal terminal electrodes 1B, 1D oppose each other in the direction in which the fifth and sixth side faces L2e, L2f oppose each other. The second signal terminal electrodes 2A, 2C oppose each other in the direction in which the fifth and sixth side faces L2e, L2f oppose each other. The second signal terminal electrodes 2B, 2D oppose each other in the direction in which the fifth and sixth side faces L2e, L2f oppose each other.

As with the first and second signal terminal electrodes 1A, 1B, 2A, 2B and first and second grounding terminal electrodes 3, 4, the first and second signal terminal electrodes 1C, 1D, 2C, 2D are formed, for example, by applying and baking a conductive paste, which contains a conductive metal powder and a glass frit, onto the outer surface of the capacitor body L2. A plating layer may be formed on the baked electrodes when necessary.

As shown in FIG. 2, the capacitor body L2 has a plurality of (3 in this embodiment) insulator layers 10 to 12 laminated, a first signal inner electrode 20, a first grounding inner electrode 40, a second signal inner electrode 30, and a second grounding inner electrode 50.

The first signal inner electrode 20 includes a main electrode portion 21 having a substantially quadrangular form whose four sides are parallel to the third, fourth, fifth, and sixth side faces L2c, L2d, L2e, L2f, respectively, lead portions 22, 23 extending from the main electrode portion 21 so as to reach the fifth side face L2e, and lead portions 24, 25 extending from the main electrode portion 21 so as to reach the sixth side face L2f. The first signal inner electrode 20 penetrates through the capacitor body L2 from the fifth side face L2e to the sixth side face L2f.

A portion of a side of the main electrode portion 21 parallel to the fourth side face L2d is formed with a recess 26 toward the third side face L2c. The lead portion 22 is drawn to the fifth side face L2e, so as to be connected to the first signal terminal electrode 1A electrically and physically. The lead portion 23 is drawn to the fifth side face L2e, so as to be connected to the first signal terminal electrode 1B electrically and physically. The lead portion 24 is drawn to the sixth side face L2f, so as to be connected to the first signal terminal electrode 1C electrically and physically. The lead portion 25 is drawn to the sixth side face L2f, so as to be connected to the first signal terminal electrode 1D electrically and physically. As a consequence, the first signal inner electrode 20 is electrically connected to the first signal terminal electrodes 1A to 1D.

The first grounding inner electrode 40 includes a main electrode portion 41 having a quadrangular form whose four sides are parallel to the third, fourth, fifth, and sixth side faces L2c, L2d, L2e, L2f, respectively, and a lead portion 42 extending from the main electrode portion 41 so as to reach the fourth side face L2d.

The main electrode portion 41 is separated from the third, fourth, fifth, and sixth side faces L2c, L2d, L2e, L2f by predetermined distances. The lead portion 42 has the same width as that of the main electrode portion 41 in the direction in which the fifth and sixth side faces L2e, L2f oppose each other. Therefore, the main electrode portion 41 and lead portion 42 are integrated, so as to yield a quadrangular form. The lead portion 42 is drawn to the fourth side face L2d, so as to be connected to the first grounding terminal electrode 3 electrically and physically. As a consequence, the first grounding inner electrode 40 is electrically connected to the first grounding terminal electrode 3.

The second signal inner electrode 30 includes a main electrode portion 31 having a substantially quadrangular form whose four sides are parallel to the third, fourth, fifth, and sixth side faces L2c, L2d, L2e, L2f, respectively, lead portions 32, 33 extending from the main electrode portion 31 so as to reach the fifth side face L2e, and lead portions 34, 35 extending from the main electrode portion 31 so as to reach the sixth side face L2f. The second signal inner electrode 30 penetrates through the capacitor body L2 from the fifth side face L2e to the sixth side face L2f.

A portion of a side of the main electrode portion 31 parallel to the third side face L2c is formed with a recess 36 toward the fourth side face L2d. The lead portion 32 is drawn to the fifth side face L2e, so as to be connected to the second signal terminal electrode 2A electrically and physically. The lead portion 33 is drawn to the fifth side face L2e, so as to be connected to the second signal terminal electrode 2B electrically and physically. The lead portion 34 is drawn to the sixth side face L2f, so as to be connected to the second signal terminal electrode 2C electrically and physically. The lead portion 35 is drawn to the sixth side face L2f, so as to be connected to the second signal terminal electrode 2D electrically and physically. As a consequence, the second signal inner electrode 30 is electrically connected to the second signal terminal electrodes 2A to 2D.

The second grounding inner electrode 50 includes a quadrangular main electrode portion 51 whose four sides are parallel to the third, fourth, fifth, and sixth side faces L2c, L2d, L2e, L2f, respectively, and a lead portion 52 extending from the main electrode portion 51 so as to reach the fourth side face L2d.

The main electrode portion 51 is separated from the third, fourth, fifth, and sixth side faces L2c, L2d, L2e, L2f by predetermined distances. The lead portion 52 has the same width as that of the main electrode portion 51 in the direction in which the fifth and sixth side faces L2e, L2f oppose each other. Therefore, the main electrode portion 51 and the lead portion 52 are integrated together to yield a quadrangular form. The lead portion 52 is drawn to the third side face L2c, so as to be connected to the second grounding terminal electrode 4 electrically and physically. As a consequence, the second grounding inner electrode 50 is electrically connected to the second grounding terminal electrode 4.

The first grounding inner electrode 40 is arranged such that the main electrode portion 41 is positioned within the recess 26 formed in the side on the fourth side face L2d side of the first signal inner electrode 20. The second grounding inner electrode 50 is arranged such that the main electrode portion 51 is positioned within the recess 36 formed in the side on the third side face L2c side of the second signal inner electrode 30.

Figure 12:
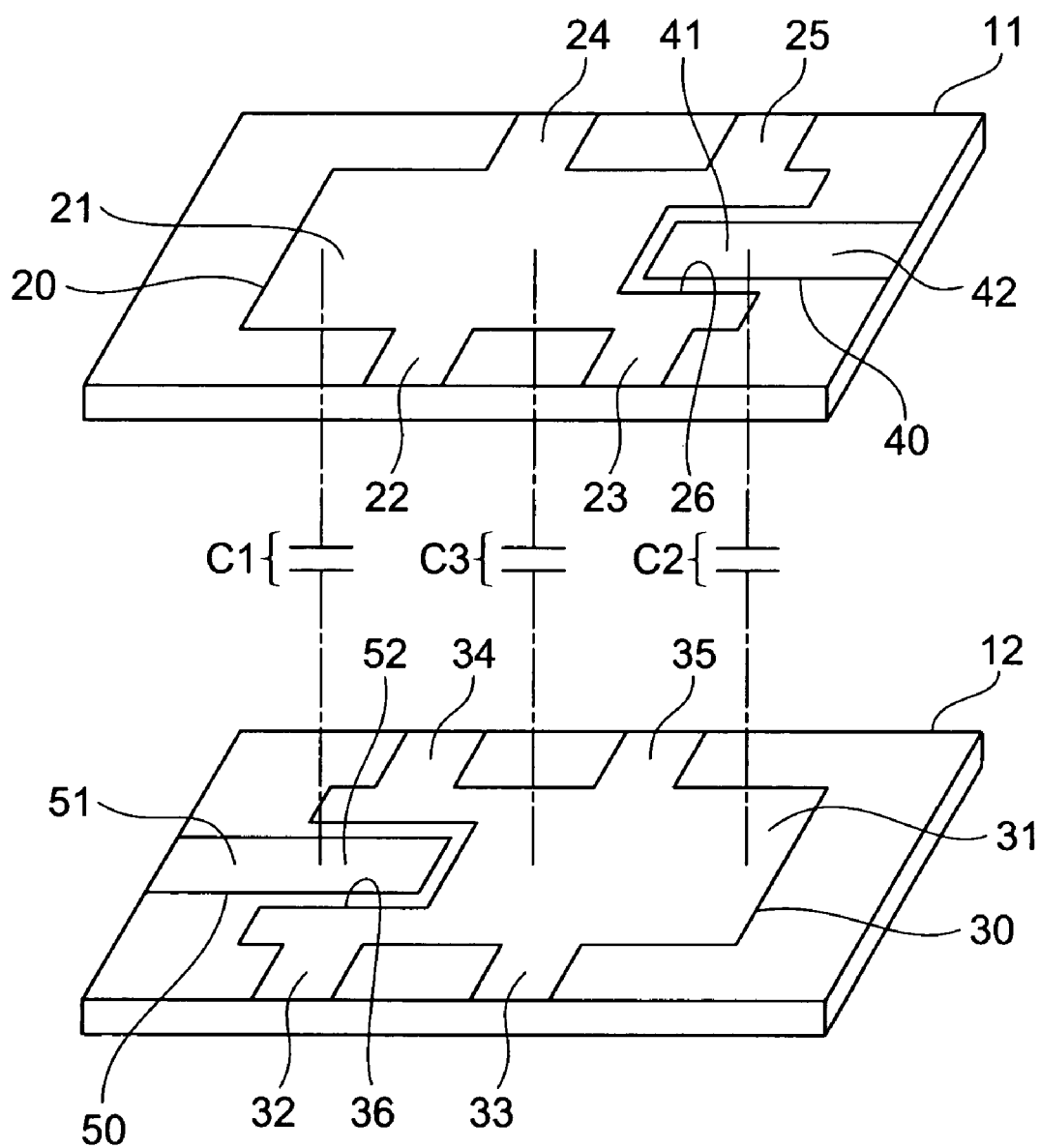
FIG. 12 is a view for explaining the fact that the inner electrodes owned by the capacitor body have portions opposing each other

The fact that the inner electrodes 20, 30, 40, 50 owned by the capacitor body L2 have portions opposing each other will be explained with reference to FIG. 12. FIG. 12 is a view for explaining the fact that the inner electrodes 20, 30, 40, 50 owned by the capacitor body L1 have portions opposing each other.

As shown in FIG. 12, the portions by which the first signal inner electrode 20 and the second grounding inner electrode 50 oppose each other form a first capacitor C1. The portions by which the second signal inner electrode 30 and the first grounding inner electrode 40 oppose each other form a second capacitor C2. The portions by which the first and second signal inner electrodes 20, 30 oppose each other form a third capacitor C3. Thus, three capacitors C1, C2, C3 are formed in the feedthrough multilayer capacitor array CA2 as shown in FIG. 12.

In the second embodiment, as in the foregoing like the above-mentioned first embodiment, the feedthrough multilayer capacitor array CA2 has not only the first and second capacitors C1, C2 formed by the fact that the signal inner electrodes 20, 30 oppose their corresponding grounding inner electrodes 40, 50, but also the third capacitor C3 formed by the signal inner electrodes 20, 30 opposing each other. The first and second capacitors C1, C2 function as capacitors for eliminating common-mode noise. On the other hand, the third capacitor C3 functions as a capacitor for eliminating differential-mode noise. Therefore, the feedthrough multilayer capacitor array CA3 can eliminate both common-mode noise and differential-mode noise.

Since each of the first and second signal inner electrodes 20, 30 penetrates through the feedthrough multilayer capacitor array CA2, equivalent series inductance (ESL) can be lowered.

In the feedthrough multilayer capacitor array CA2, the first and second signal inner electrodes 20, 30 have respective portions opposing each other while holding the insulator layer 11 therebetween. Therefore, current flow paths become greater than conventional ones. As a consequence, the feedthrough multilayer capacitor array CA2 can reduce the equivalent series inductance.

In particular, the feedthrough multilayer capacitor array CA2 has two kinds of grounding inner electrodes 40, 50 which oppose their corresponding signal inner electrodes 20, 30. This further increases the current flow paths, whereby the feedthrough multilayer capacitor array CA1 can further reduce the equivalent series inductance.

The first signal inner electrode 20 and first grounding inner electrode 40 are positioned between the same two insulator layers 10, 11. The second signal inner electrode 30 and second grounding inner electrode 50 are positioned between the same two insulator layers 11, 12. Therefore, they can be manufactured efficiently.

The first signal inner electrode 20 and first grounding inner electrode 40 are positioned on the same insulator layer 11. The second signal inner electrode 30 and second grounding inner electrode 50 are positioned on the same insulator layer 12. Therefore, the feedthrough multilayer capacitor array CA2 can be manufactured efficiently as with the feedthrough multilayer capacitor array CA1 in accordance with the above-mentioned first embodiment.

The same insulator layer 11 is held between the first signal inner electrode 20 and second grounding inner electrode 50, between the second signal inner electrode 30 and first grounding inner electrode 40, and between the first and second signal inner electrodes 20, 30. In this case, characteristics of the capacitors C1, C2, C3 included in the feedthrough multilayer capacitor array CA2 can be regulated easily.

The first signal terminal electrodes 1A, 1B and the second signal terminal electrodes 2A, 2B are arranged on the fifth side face L2e, which is the same side face of the capacitor body L2. The first signal terminal electrodes 1C, 1D and the second signal terminal electrodes 2C, 2D are arranged on the sixth side face L2f, which is the same side face of the capacitor body L2. Therefore, when the first signal terminal electrodes 1A, 1B and second signal terminal electrodes 2A, 2B are connected to heteropolar land patterns and the like, the current flowing through the first signal inner electrode 20 and the current flowing through the second signal inner electrode 30 are directed opposite to each other. Also, the first signal inner electrode 20 and second signal inner electrode 30 oppose each other while holding the insulator layer 11 therebetween. Therefore, equivalent series inductance can be reduced.

The first and second signal terminal electrodes 1A to 1D, 2A to 2D are provided four by four. The signal inner electrodes 20, 30 include four lead portions 22 to 25, 32 to 35, respectively. This increases paths for currents flowing into and out of the signal inner electrodes 20, 30, thereby further reducing the equivalent series inductance in the feedthrough multilayer capacitor array CA2.

Though preferred embodiments of the present invention are explained in the foregoing, the present invention is not necessarily restricted to the above-mentioned embodiments and modified example, but can be altered in various ways within the scope not deviating from the gist thereof.

Though the first signal inner electrode 20 and first grounding inner electrode 40 are arranged on the same insulator layer in the above-mentioned embodiments, this is not restrictive. For example, the first signal inner electrode 20 and first grounding inner electrode 40 may be arranged on different insulator layers, i.e., at different positions in the laminating direction of the insulator layers 10 to 12. Though the second signal inner electrode 30 and second grounding inner electrode 50 are arranged on the same insulator layer 12 in the above-mentioned embodiments, this is not restrictive. For example, the second signal inner electrode 30 and second grounding inner electrode 50 may be arranged on different insulator layers, i.e., at different positions in the laminating direction of the insulator layers 10 to 12.

The number of insulator layers 10 to 12 laminated and the number of layers to be arranged with the inner electrodes 20, 30, 40, 50 are not limited to those stated in the above-mentioned embodiments. The forms of the inner electrodes 20, 30, 40, 50 are not limited to those described in the above-mentioned embodiments and modified example.

The number of insulator layers held between the first signal inner electrode 20 and second grounding inner electrode 50 may be 2 or more, for example, without being restricted to the number stated in the above-mentioned embodiments. The number of insulator layers held between the second signal inner electrode 30 and second grounding inner electrode 50 may be 2 or more, for example, without being restricted to the number stated in the above-mentioned embodiments. The number of insulator layers held between the first and second signal inner electrodes 20, 30 may be 2 or more, for example, without being restricted to the number stated in the above-mentioned embodiments.

The numbers of the signal terminal electrodes 1A to 1D, 2A to 2D, and grounding terminal electrodes 3, 4 are not limited to those stated in the above-mentioned embodiments. For example, it will be sufficient if the first and second signal terminal electrodes are provided by at least two each.

Though the first and second signal terminal electrodes are arranged on the same side faces of a capacitor body in the above-mentioned embodiments, it will be sufficient if the terminal electrodes 1A to 1D, 2A to 2D, 3, 4 are arranged on the outer surface of the capacitor body without being restricted to the arrangements described in the above-mentioned embodiments. Therefore, it is not always necessary for the first and second signal terminal electrodes to be arranged on the same side faces, for example.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A feedthrough multilayer capacitor array having a first lead and a second lead comprising:
   a capacitor body;
   at least two first signal terminal electrodes arranged on an outer surface of the capacitor body;
   at least two second signal terminal electrodes arranged on the outer surface of the capacitor body;
   at least one first grounding terminal electrode arranged on the outer surface of the capacitor body; and
   at least one second grounding terminal electrode arranged on the outer surface of the capacitor body;
   wherein:
   the capacitor body has a plurality of insulator layers laminated, first and second signal inner electrodes, and first and second grounding inner electrodes;
   the first signal inner electrode is connected to the at least two first signal terminal electrodes;
   the second signal inner electrode is connected to the at least two second signal terminal electrodes;
   the first grounding inner electrode is connected to the at least one first grounding terminal electrode;
   the second grounding inner electrode is connected to the at least one second grounding terminal electrode;
   the first signal inner electrode and second grounding inner electrode include respective portions opposing each other while holding therebetween at least one of the plurality of insulator layers;
   the second signal inner electrode and first grounding inner electrode include respective portions opposing each other while holding therebetween at least one of the plurality of insulator layers;
   the first and second signal inner electrodes include respective portions opposing each other while holding therebetween at least one of the plurality of insulator layers and not holding therebetween any of the inner electrodes;
   one of the at least two first signal terminal electrodes and one of the at least two second signal terminal electrodes are arranged on the same side face in the outer surface of the capacitor body;
   the other of the at least two first signal terminal electrodes and the other of the at least two second signal terminal electrodes are arranged on a same side face in the outer surface of the capacitor body;
   both of the at least two first signal terminal electrodes are connected to the first lead;
   both of the at least two second signal terminal electrodes are connected to the second lead;
   the first and second signal terminal electrodes arranged on the same side face are connected to the first and second lead respectively so as to be heteropolar;
   the first grounding terminal electrode is arranged on a side face other than the side faces on which the first and second signal terminal electrodes are arranged and is not arranged on the side faces on which the first and second signal terminal electrodes are arranged; and the second grounding terminal electrode is arranged on a side face other than the side faces on which the first and second signal terminal electrodes are arranged and is not arranged on the side faces on which the first and second signal terminal electrodes are arranged.

2. The feedthrough multilayer capacitor array according to claim 1, wherein:

the first signal inner electrode and first grounding inner electrode are arranged on the same insulator layer in the plurality of insulator layers;

the second signal inner electrode and second grounding inner electrode are arranged on the same insulator layer in the plurality of insulator layers; and the insulator layer having the first signal inner electrode and first grounding inner electrode arranged thereon and the insulator layer having the second signal inner electrode and second grounding inner electrode arranged thereon differ from each other.

3. The feedthrough multilayer capacitor array according to claim 1, wherein the at least one insulator layer held between the first signal inner electrode and second grounding inner electrode, the at least one insulator layer held between the second signal inner electrode and first grounding inner electrode, and the at least one insulator layer held between the first and second signal inner electrodes are the same.

4. The feedthrough multilayer capacitor array according to claim 1, wherein:

one of the at least two first signal terminal electrodes and one of the at least two second signal terminal electrodes are arranged on the same side face in the outer surface of the capacitor body; and the other of the at least two first signal terminal electrodes and the other of the at least two second signal terminal electrodes are arranged on the same side face in the outer surface of the capacitor body.

5. The feedthrough multilayer capacitor array according to claim 1, wherein:

at least three each of the first and second signal terminal electrodes are provided;

the first signal inner electrode is connected to the at least three first signal terminal electrodes; and the second signal inner electrode is connected to the at least three second signal terminal electrodes.

6. The feedthrough multilayer capacitor array according to claim 1, further comprising third and fourth leads, wherein:

the first lead is connected to the third lead at two different points; and the second lead is connected to the fourth lead at two different points.

* * * * *